US005388802A

United States Patent [19]

Dougan et al.

[11] Patent Number: 5,388,802

[45] Date of Patent: Feb. 14, 1995

[54] METHOD AND APPARATUS FOR SUSPENDING CHRISTMAS LIGHTS UNDERNEATH EAVES ON A HOUSE

[75] Inventors: William B. Dougan; Murray R. Nesbitt, both of Calgary, Canada

[73] Assignee: Brimur International Ltd., Calgary, Canada

[21] Appl. No.: 181,241

[22] Filed: Jan. 13, 1994

[51] Int. Cl.$^{6}$ ..................................... F16L 3/08

[52] U.S. Cl. ........................ 248/74.2; 248/231.2; 362/249; 362/806

[58] Field of Search ............... 248/316.7, 231.8, 231.9, 248/231.91, 221.4, 231.2, 74.2, 73; 362/249, 250, 396, 806

[56] References Cited

U.S. PATENT DOCUMENTS

| | | | |
|---|---|---|---|
| 2,471,584 | 5/1949 | Richards | 248/71 |
| 3,193,229 | 7/1965 | Stock | 248/231.8 X |
| 3,300,168 | 1/1967 | Gaudino | 248/231.8 X |
| 3,437,298 | 4/1969 | Seckerson | 248/71 |
| 3,599,916 | 8/1971 | Szabo | 248/73 |
| 3,599,918 | 8/1971 | Patchett | 248/215 |
| 3,883,926 | 5/1975 | Reynolds | 248/231.8 X |
| 4,260,122 | 4/1981 | Fiala | 248/71 |
| 4,667,910 | 5/1987 | Atterby et al. | 248/71 |
| 4,905,131 | 2/1990 | Gary | 362/249 |
| 4,974,128 | 11/1990 | Prickett | 362/249 X |
| 5,056,747 | 10/1991 | Kireta | 248/231.8 |
| 5,249,108 | 9/1993 | Gary | 248/291 X |

FOREIGN PATENT DOCUMENTS

| | | | |
|---|---|---|---|
| 955225 | 9/1974 | Canada | 248/46 |

*Primary Examiner*—Blair M. Johnson

*Attorney, Agent, or Firm*—Anthony R. Lambert

[57] ABSTRACT

A method of suspending christmas lights underneath eaves of a house finished with aluminum or vinyl soffit panels and facia. Firstly, attach a plurality of wedge shaped members to a string of christmas lights. Secondly, insert the wedge shaped members between facia and soffit of a house. The christmas lights protrude perpendicularly below the facia and are clearly visible from an adjacent street while the wedge shaped members and light cord remain substantially hidden from view by the facia.

5 Claims, 4 Drawing Sheets

METHOD AND APPARATUS FOR SUSPENDING CHRISTMAS LIGHTS UNDERNEATH EAVES ON A HOUSE

The present invention relates to a method of and apparatus for suspending christmas lights from eaves on a house finished with aluminum or vinyl soffit panels and facia.

BACKGROUND OF THE INVENTION

A variety of methods and related apparatus have been developed for the purpose of suspending christmas lights from eaves on a house. All of these methods and related apparatus are to some extent deficient. Each "string" of christmas lights consists of a plurality of sockets, into which light bulbs are inserted, connected by a shielded electrical cord. One method involves suspending the christmas lights from an eaves trough on a house. A variety of specially designed clips have been developed for this purpose. These clips suspend the christmas lights from the outer most peripheral edge of the eaves trough. The best functioning clip developed for this purposes has a generally "U" shaped gripping portion which grips the sockets such that the light bulbs are suspended in parallel spaced relation to the eaves trough. This clip has a number of deficiencies. The light bulbs and cord vibrate against the eaves when exposed to strong winds, which often damages the delicate filaments in the light bulbs. The clip and the cord are clearly visible from the sidewalk, detracting from the aesthetics of the light display. The cord and bulbs are directly exposed to ultra violet rays of the sun which, over time, causes their deterioration. The cord is suspended in the eaves trough, which sometimes leads to blockage of the eaves trough. Another method of suspending the christmas lights from the eaves of on a house involves using "tabs" which are inserted under the shingles. This method is unsightly as a large portion of the tab as well as the light cord and socket remain visible. In addition, there are functional deficiencies as the tabs which suspend the lights are extremely prone to vibration when exposed to strong winds and suspend the lights at an angle. The tabs tend to deteriorate due to constant exposure to the elements, including the effects of the ultra violet rays of the sun and exposure to snow, sleet and the like. Another method involves using a permanent clip which is attached to the house by means of nails or screws. These permanent clips are always visible, and upon removal scar the exterior finish of the house. Over time, the nails or screws used to attach the clips rust.

SUMMARY OF THE INVENTION

What is required is a new method of and apparatus for suspending christmas lights from eaves on a house which overcomes the above described disadvantages.

According to one aspect of the present invention there is provided a method of suspending christmas lights underneath eaves of a house finished with aluminum or vinyl soffit panels and facia, which is comprised of the following described steps. Firstly, attach a plurality of wedge shaped members to a string of christmas lights. Secondly, insert the wedge shaped members between facia and soffit of a house.

When the teaching of this method is followed, the christmas lights protrude perpendicularly below the facia and are clearly visible from an adjacent street while the wedge shaped members and light cord remain substantially hidden from view by the facia. The electric cord is held securely and the christmas lights are suspended vertically in an aesthetically pleasing manner. In the event of strong winds, the lights are suspended in such a manner that there is no portion of the house against which the lights can be blown by the wind and the lights are partially sheltered by the eaves. The gap between the facia and the soffit into which the wedge shaped members are inserted can vary up to ½ an inch, it is therefore preferable that the wedge shaped member be specially adapted for its intended purpose.

According to another aspect of the invention there is provided an apparatus for suspending christmas lights underneath eaves of a house which is comprised of a compressible wedge shaped body of resilient material having an apex, two ends and an exterior surface extending between the apex and the ends. Means is secured to the exterior surface adjacent the one of the ends for gripping an electric cord.

It is preferred that the wedge shaped body be generally "V" shaped with opposed interior sidewalls. It is also preferred that the means for gripping the electric cord is a clamping member adapted to clamp the electric cord against the exterior surface of the wedge shaped body. It is also preferred that the wedge shaped body be made of a polymer plastic material such as polyvinylchloride.

Although beneficial results may be obtained through the use of the apparatus as described, if a limit is not placed upon the extent to which the wedge shaped body can be compressed, the wedge shaped body can become dislodged. Even more beneficial results may, therefore, be obtained when the opposed interior sidewalls each have transverse projections. The projections are brought into contact upon compression of the wedge shaped body to limit compression.

Although beneficial results may be obtained through the use of the apparatus, as described, it can be difficult to insert the electric cord into the clamping member. Even more beneficial results may, therefore, be obtained when the clamping member has a lip which curls away from the exterior surface thereby facilitating insertion of the electric cord.

Although beneficial results may be obtained through the use of the apparatus, as described, there is a tendency for a length of electric cord to twist. The twisting of the cord alters the positioning of the christmas lights so that they do not all hang vertically and this detracts from the aesthetic appearance of the lights. Even more beneficial results may, therefore, be obtained when the clamping member has an interior gripping surface with a plurality of transverse ribs. The transverse ribs provide resistance to twisting of the electric cord.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 3:
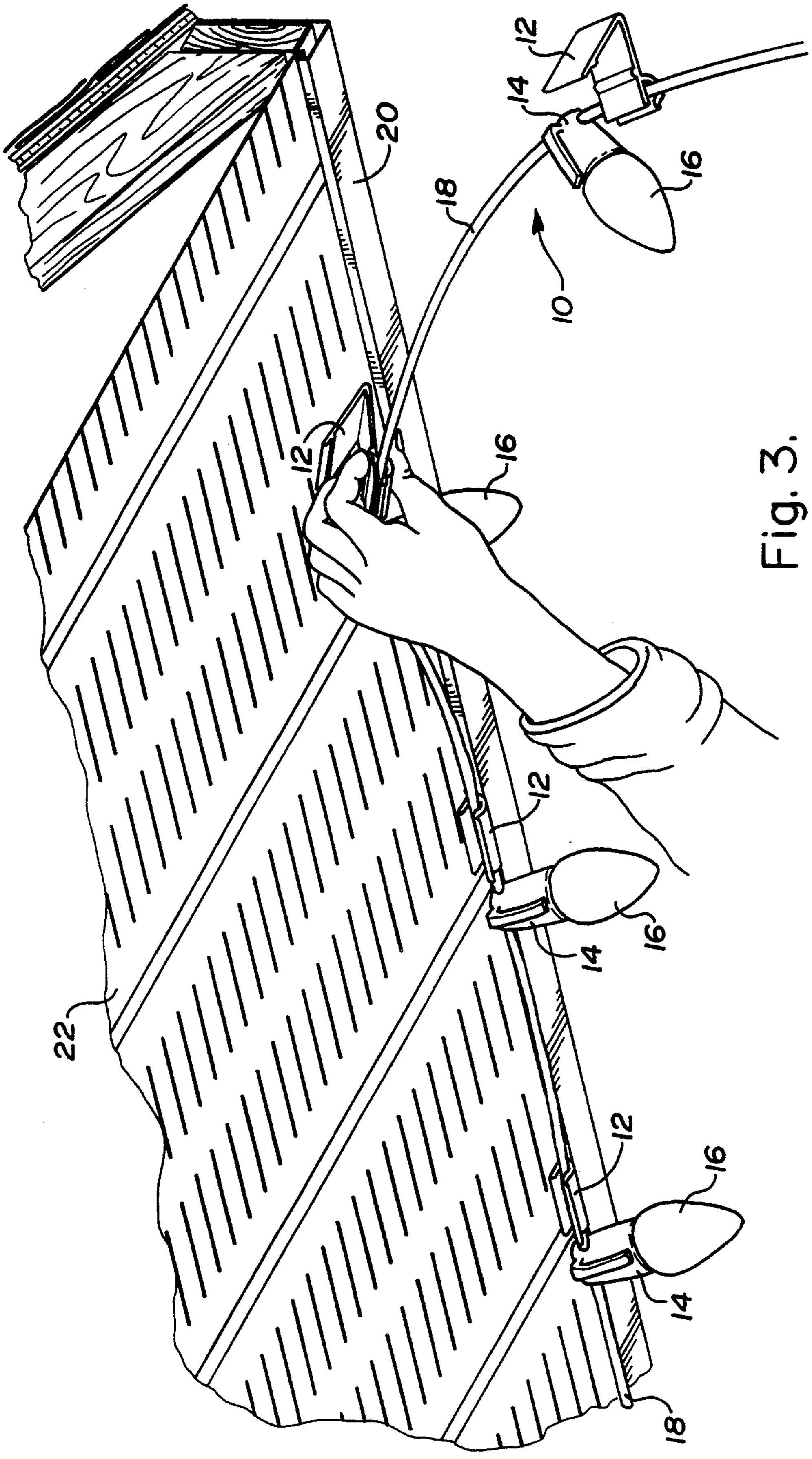
FIG. 3 is a perspective view illustrating the teachings of the method.
Figure 4:
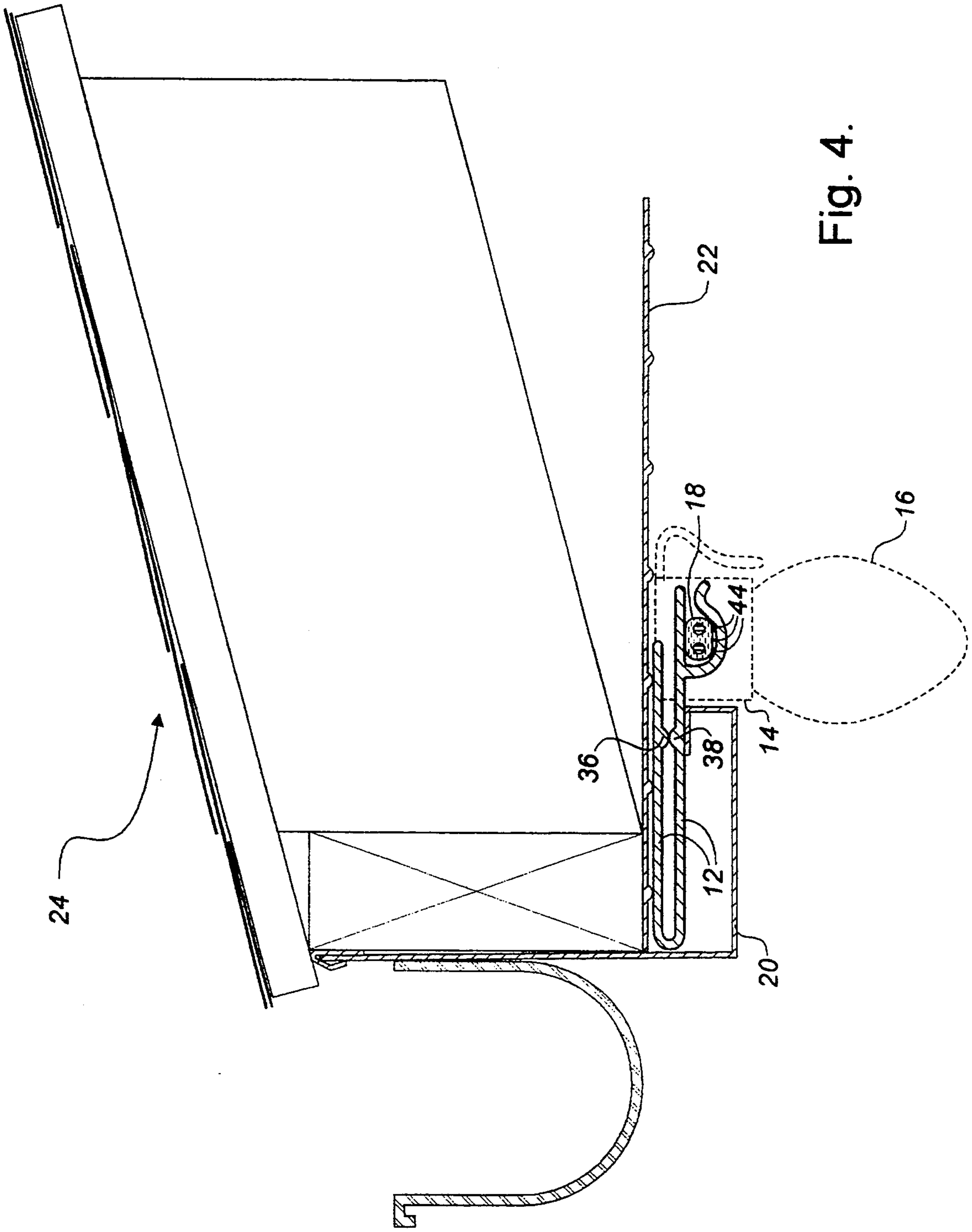
FIG. 4 is a side elevation view illustrating the teachings of the method.

The preferred method of suspending christmas lights underneath eaves of a house finished with aluminum or vinyl soffit panels and facia will now be described with reference to FIGS. 3 and 4. Firstly, attach a plurality of wedge shaped members 12 to a string of christmas lights 10. Each string of christmas lights 10 consists of a plurality of sockets 14, into which light bulbs 16 are inserted, connected by a shielded electrical cord 18. Secondly, insert wedge shaped members 12 between facia 20 and soffit 22 of a house 24. It is preferred that wedge shaped members 12 are approximately the same length as the depth of facia 20. When installed as described, light bulbs 16 of string of christmas lights 10 protrude perpendicularly below facia 20 and are clearly visible from an adjacent street while wedge shaped members 12 and cord 18 remain substantially hidden from view by facia 20.

Figure 1:
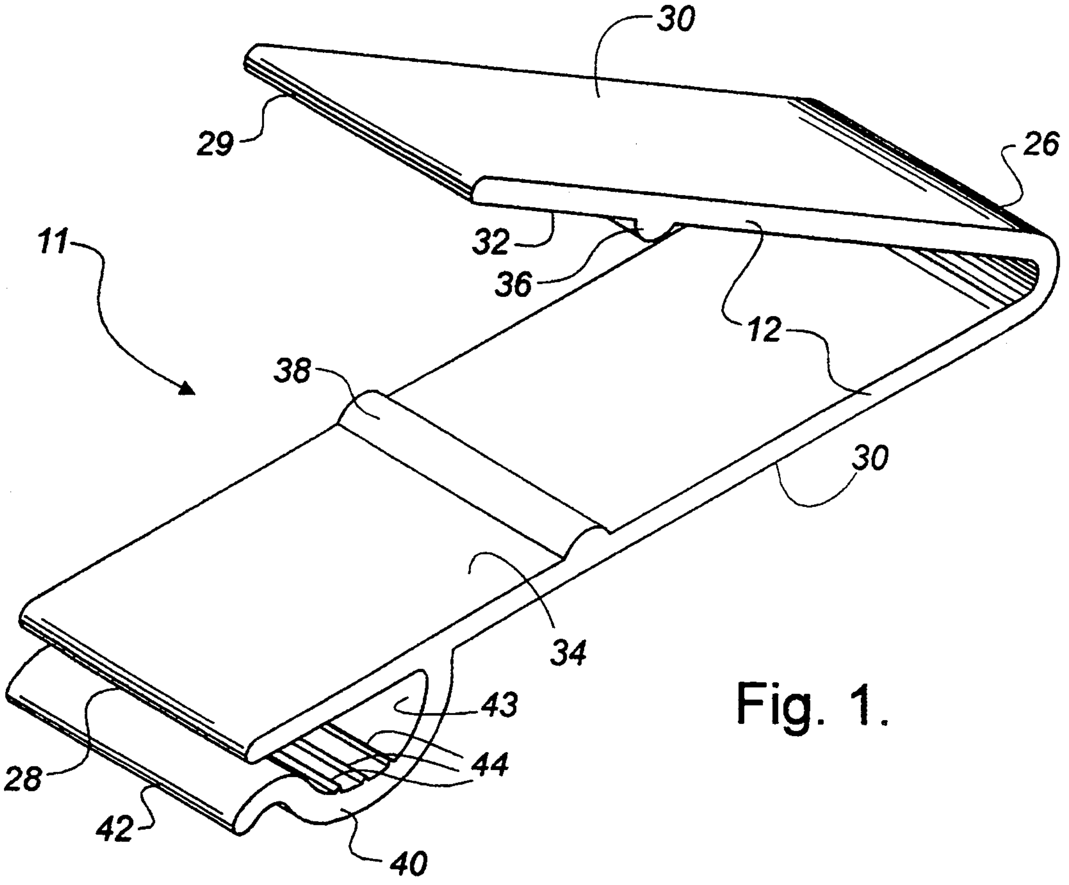
FIG. 1 is a perspective view of an apparatus constructed in accordance with the teachings of the present invention.
Figure 2:
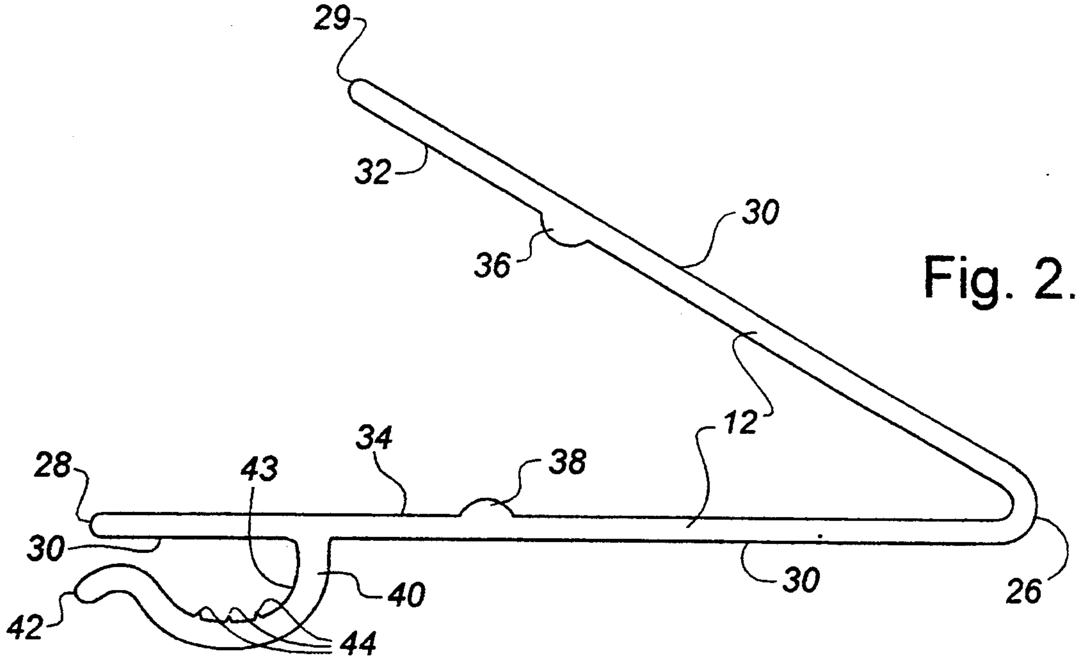
FIG. 2 is a side elevation view of the apparatus illustrated in FIG. 1.
Figure 5:
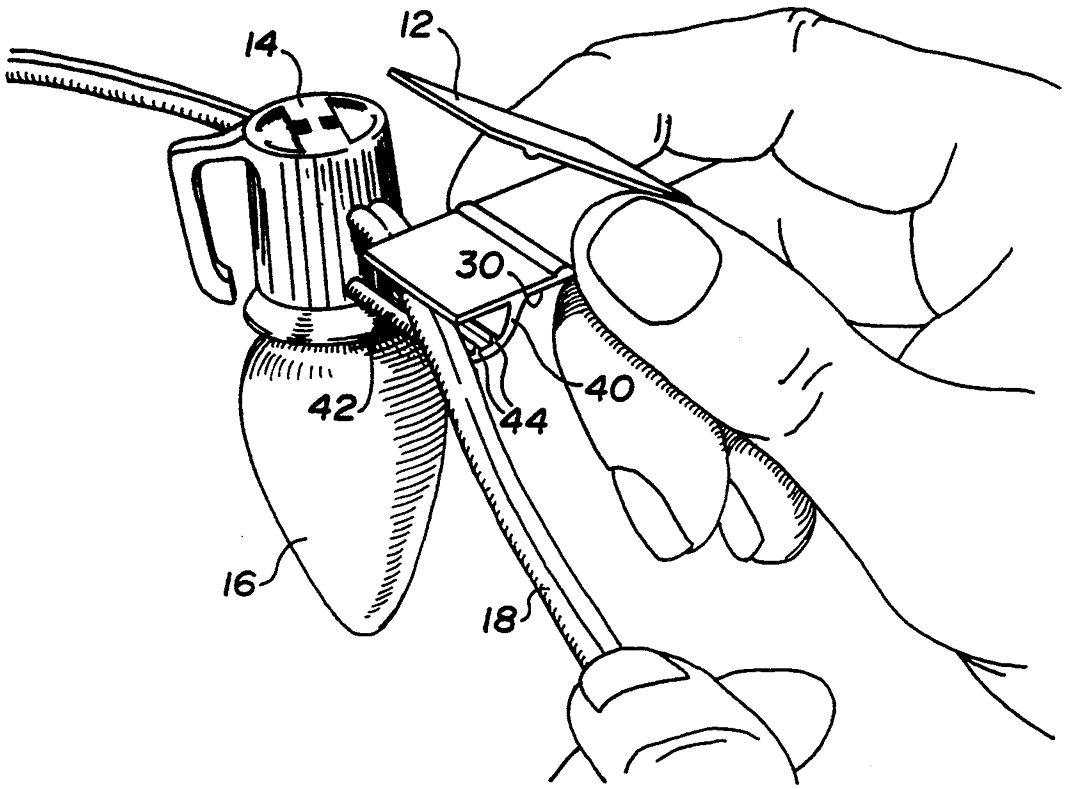
FIG. 5 is a perspective view illustrating the mode of attachment of the apparatus illustrated in FIG. 1 to a string of christmas lights.

The preferred embodiment, an apparatus for suspending christmas lights underneath eaves of a house generally identified by reference numeral 11, will now be described with reference to FIGS. 1, 2 and 5. Apparatus 11 has a compressible generally "V" shaped wedge member 12 of resilient polymer plastic material, such as polyvinylchloride. Wedge member 12 has an apex 26, two ends 28 and 29 opposed to apex 26, an exterior surface 30 and opposed interior sidewalls 32 and 34. Exterior surface 30 extends between apex 26 and ends 28 and 29. Opposed interior sidewalls 32 and 34 each have transverse projections 36 and 38, respectively. A clamping member 40 is secured to exterior surface 30 adjacent end 28. Referring to FIGS. 3 and 5, clamping member 40 is adapted to clamp electrical cord 18 against exterior surface 30 of wedge shaped member 12. Referring to FIGS. 1 and 2, clamping member 40 has a lip 42 which curls away from exterior surface 30. Clamping member 40 also has an interior gripping surface 43 made up of a plurality of transverse ribs 44.

In order to use apparatus 11 electrical cord 18 is inserted into clamping member 40, as illustrated in FIG. 5. The manner in which lip 42 curls away from exterior surface 30 assists in facilitating the insertion of electric cord 18 into clamping member 40. Wedge shaped member 12 is then compressed for insertion between facia 20 and soffit 22, as illustrated in FIGS. 3 and 4. Projections 36 and 38 are brought into contact upon compression of wedge shaped member 12 to limit total compression. The resilient nature of wedge shaped member 12 causes it to tend to resume its original shape. This assists in securely wedging wedge shaped member 12 in position. Transverse ribs 44 provide resistance to twisting of the electric cord 18 to ensure light bulbs 16 are maintained in a substantially vertical position.

It will be appreciated that materials other than polyvinylchloride, such as polypropylene and polyethylene, may be used in the construction of wedge shaped members 12.

It will be apparent to one skilled in the art that modifications may be made to the illustrated embodiment without departing from the spirit and scope of the invention as defined by the claims.

The embodiments of the invention in which an exclusive property or privilege is claimed are defined as follows:

1. A method of suspending christmas lights underneath eaves of a house finished with aluminum or vinyl soffit panels and facia, comprising the steps of:
   a. firstly, attaching a plurality of V-shaped wedge members to a cord of a string of christmas lights, the V-shaped wedge shaped members each having means in the form of at least one protrusion on at least one of the opposing interior surfaces of the legs of said V-shaped wedge member to limit compression of said V-shaped wedge member; and
   b. secondly, wedging the V-shaped wedge members between facia and soffit of a house, such that the christmas lights protrude substantially perpendicularly below the facia and are clearly visible from an adjacent street while the V-shaped wedge members remain substantially hidden from view by the facia.

2. An apparatus for suspending christmas lights underneath eaves of a house, comprising:
   a compressible generally wedge shaped body of resilient material having an apex, two ends and an exterior surface extending between the apex and the ends, the wedge shaped body assuming a generally "V" shape at maximum expansion, the wedge shaped body having opposed interior sidewalls, the opposed interior sidewalls each having transverse projections such that the projections are brought into contact upon compression of the wedge shaped body to limit compression; and
   means for gripping an electric cord secured to the exterior surface adjacent one of the ends.

3. The apparatus for suspending christmas lights underneath eaves of a house as defined in claim 2, the means for gripping an electric cord being a clamping member adapted to clamp the electric cord against the exterior surface of the wedge shaped body.

4. The apparatus for suspending christmas lights underneath eaves of a house as defined in claim 3, the clamping member having a lip which curls away from the exterior surface thereby facilitating insertion of the electric cord.

5. In combination:
   an electrical cord; and
   an apparatus for suspending christmas lights underneath eaves of a house, comprising:
   a compressible generally wedge shaped body of resilient material having an apex, two ends and an exterior surface extending between the apex and the ends, the wedge shaped body assuming a generally "V" shape at maximum expansion, the wedge shaped body having opposed interior sidewalls, the opposed interior sidewalls each having transverse projections such that the projections are brought into contact upon compression of the wedge shaped body to limit compression; and
   a clamping member adapted to clamp the electric cord against the exterior surface of the wedge shaped body, the clamping member having an interior gripping surface with a plurality of transverse ribs, such that the transverse ribs provide resistance to twisting of the electric cord.

* * * * *